United States Patent [19]

van Mil

[11] Patent Number: 4,570,295
[45] Date of Patent: Feb. 18, 1986

[54] APPARATUS FOR TRANSFERRING SLAUGHTERED POULTRY

[75] Inventor: Martinus P. G. van Mil, Boxmeer, Netherlands

[73] Assignee: Stork PMT B.V., Boxmeer, Netherlands

[21] Appl. No.: 494,663

[22] Filed: May 16, 1983

[30] Foreign Application Priority Data

May 28, 1982 [NL] Netherlands .................. 8202180

[51] Int. Cl.[4] .................. A22B 3/08; A22B 5/00; A22C 21/00
[52] U.S. Cl. .................................. 17/11; 17/24
[58] Field of Search .............. 17/11, 12, 24, 51, 52

[56] References Cited

U.S. PATENT DOCUMENTS

| 3,077,997 | 2/1963 | Toennies | 17/24 |
| 3,643,293 | 2/1972 | Rejsa et al. | 198/477 |
| 4,034,440 | 7/1977 | van Mil | 17/24 |
| 4,071,924 | 2/1978 | Meyn | 17/24 |
| 4,178,659 | 12/1979 | Simonds | 17/24 |
| 4,423,808 | 1/1984 | Venturelli | 17/24 |

Primary Examiner—Kuang Y. Lin
Assistant Examiner—Kurt Rowan
Attorney, Agent, or Firm—Newton, Hopkins & Ormsby

[57] ABSTRACT

Apparatus for transferring slaughtered poultry, comprising an entry station, a hook cutter and an exit station with an endless belt conveyor connecting said stations and carrying transfer shackles on which the birds hang with their thighs, the exit station being provided with controllable ejectors.

8 Claims, 7 Drawing Figures

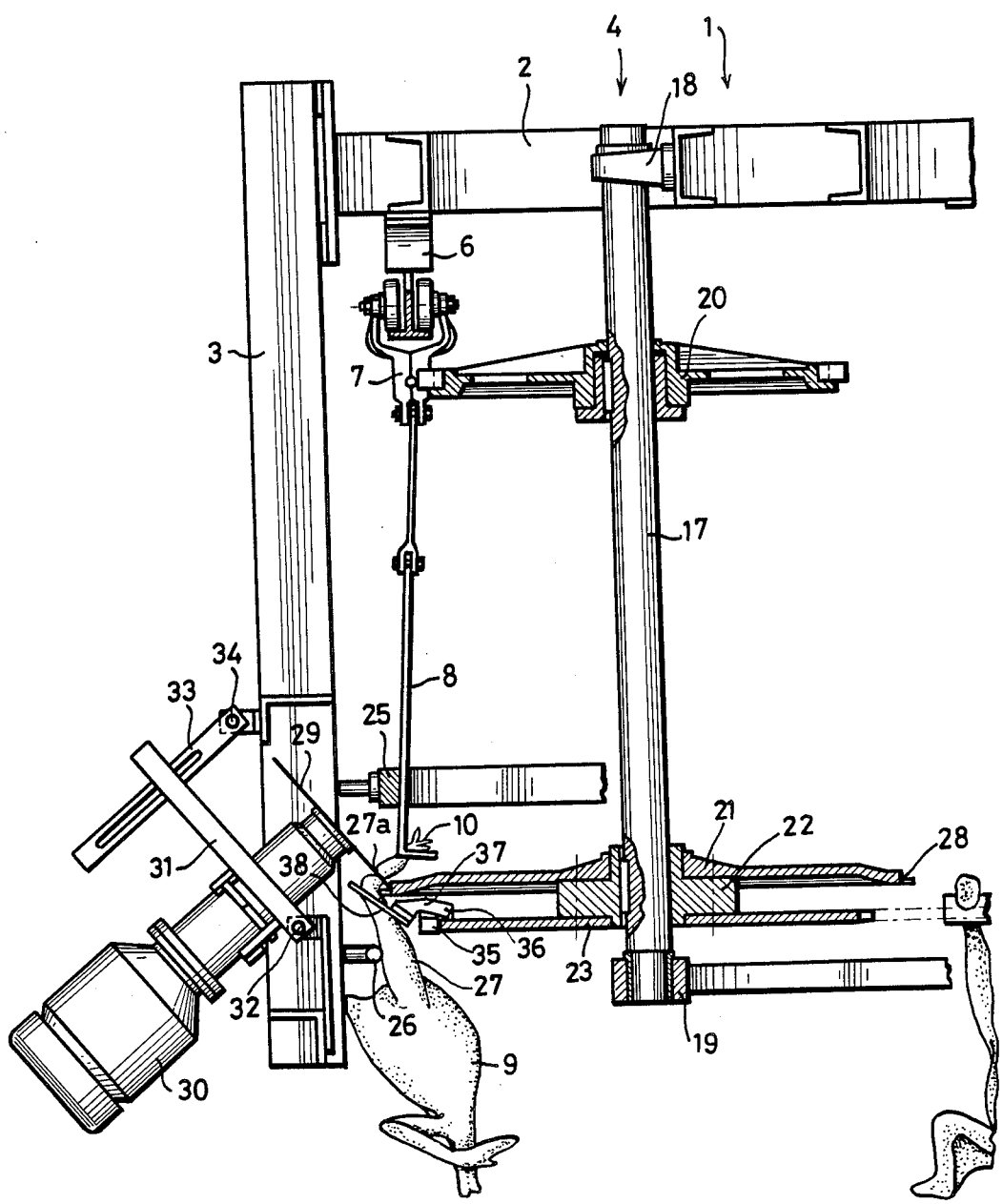
FIG:1a.

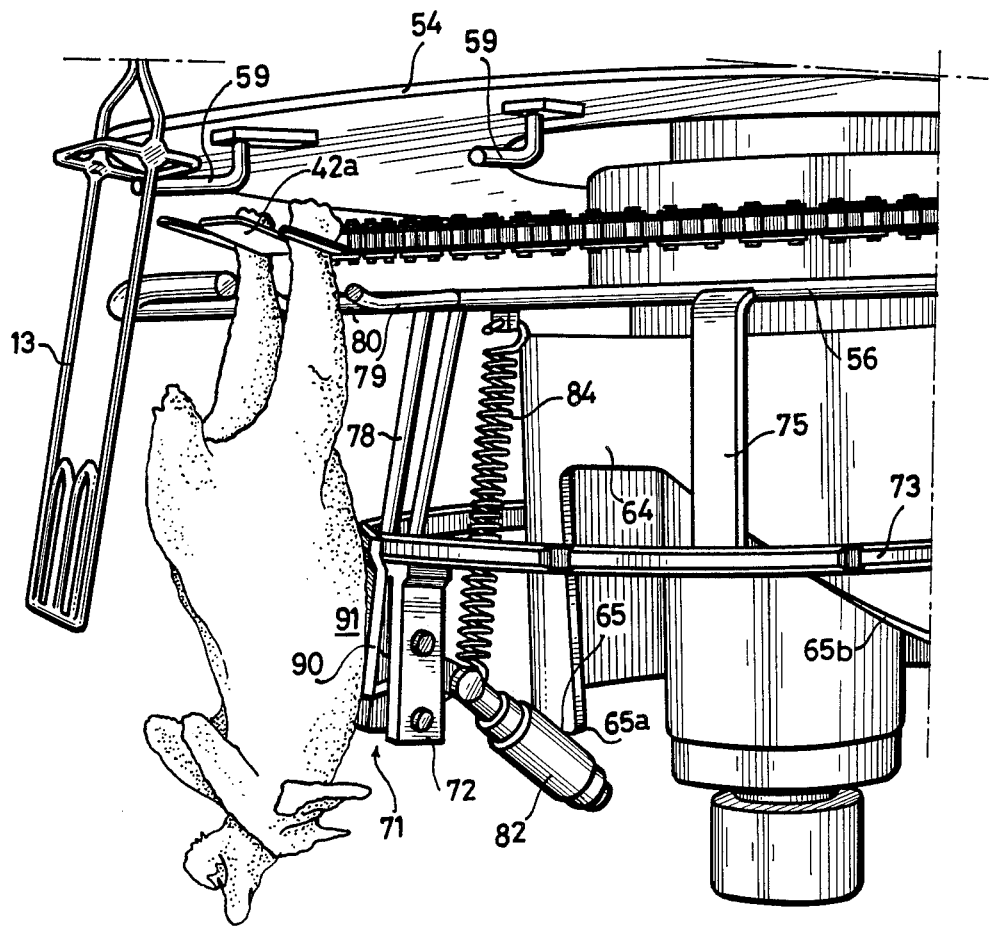
FIG: 4.

APPARATUS FOR TRANSFERRING SLAUGHTERED POULTRY

BACKGROUND OF THE INVENTION

1. Field of the Invention

The invention relates to an apparatus for transferring slaughtered poultry from a first conveyor having first suspension shackles engaging the feet of the birds, to a second conveyor having second suspension shackles engaging the hock joints of the birds, comprising an entry station adjoining the first conveyor for introducing the birds by their thighs into transfer shackles on an endless transfer conveyor extending between the first and second conveyors, a means for cutting the hock joints of the birds, and an exit station adjoining the second conveyor for transferring the birds from the transfer shackles to the second shackles.

2. Description of the Prior Art

Such an apparatus is known in itself from the U.S. Pat. No. 3,643,293. This known apparatus uses quite complicated transfer shackles each consisting of a fixed and a movable part between which the legs of the birds to be transferred are clamped; these shackles move along a long and voluminous transfer conveyor partially consisting of two parallel parts. The entry into, and the exit from this conveyor is controlled by proximity switches which control entry and exit means respectively; the whole apparatus is complicated, vulnerable, has only a limited capacity and is difficult to clean.

SUMMARY OF THE INVENTION

The invention aims to provide an apparatus of which the structure is much more simple than that of the known device and which uses simple but very efficient transfer shackles.

According to the invention the transfer conveyor is formed by an endless belt rotating between the two stations and driven in synchronism with the first conveyor, said belt bearing the transfer shackles which project radially outwards, each shackle having two adjacent receiving slots for receiving the birds' thighs in the entry station when a first shackle and a transfer shackle meet therein, and the exit station is provided with controllable ejectors acting radially on the bird, the said ejectors being driven along a path such that an ejector, a transfer shackle, and a second shackle always register with one another.

The transfer shackles which do not comprise moving parts and can easily be cleaned take up the legs of the bird securely and reliably; by the shape of the transfer shackles in which the birds are held by their own weight the ejectors can have a simple structure because it is only necessary to press the legs from the slots.

In a preferred embodiment the transfer shackle consists of a part in the form of a plate in which the receiving slots are formed with side edges converging from the entry end, that side of the plate-shaped part which extends away from the entry openings being connected to the short arm of a carrier in the form of a hook, the long arm of which is connected, so as to pivot about an axis parallel to the plane of the plate-shaped part, to a driver coupled to the rotating conveyor.

A good entry of the bird in the transfer shackle is secured when each transfer shackle cooperates with a guide yoke situated thereabove during the reception of a bird therein, said yoke consisting of two first parts which converge in the direction of the first conveyor and slope upwardly to some extent and which merge into two downwardly extending second parts terminating in a point.

Preferably each of the ejectors comprises a rocking lever the bottom end of which is pivotable about a horizontal axis while the top end bears a U-shaped yoke having its open end directed towards the bird for ejection, said rocking lever being received in a frame situated beneath the transfer shackle conveyor and driven in the direction of movement thereof, and coupled to a drive system for driving the yoke at a high speed of rotation around the axis.

The drive system can be a pre-stressed spring element or an actuator, and preferably each ejector is provided with a stop for the bird's body, said stop being rotatable about a horizontal axis in the ejector frame and being coupled to a locking hook which co-operates with a locking hook of the rocking lever and which, when the stop is in the pressed-in position, releases the rocking lever.

In a preferred embodiment of the ejector the spring element is a compression spring which acts on one end of a push rod, the other end of which is pivotably coupled to the short part of the rocking lever, the long part of which bears the ejector, said push rod bearing a laterally projecting stop cam which cooperates with the short end of a second toggle lever, the other part of which is coupled to the stop for the bird's body.

In a preferred embodiment the entry station is constructed with a first guide wheel rotatable about a vertical shaft, a guide for the first suspension shackles, said guide being situated thereabove and extending arcuately over part of the wheel periphery starting from an entry portion, and a guide for the bird's thighs, said guide being situated beneath the first guide and also extending arcuately over a part of the wheel periphery starting from an entry portion, and a cutter system cooperating with the edge of the guide wheel, and a second guide wheel situated beneath the first guide wheel and having its periphery coupled to the belt bearing the transfer shackles, while the exit station is constructed with a third guide wheel rotatable about a second vertical shaft and coupled to the guide belt, and, situated thereabove and projecting radially therefrom, a fourth guide wheel, the periphery of which forms a stop for the second suspension shackles, the ejector frames being disposed for rotation in a ring around said second vertical shaft in such a manner that the control cams thereof cooperate with the circular guide path also disposed around said second shaft.

Preferably the first and second guide wheels are coupled to the first shaft, which is rotated by the first conveyor via a first driver wheel, and the fourth guide wheel is coupled to the second shaft, which is rotated by the second conveyor via a second driver wheel, said second shaft carrying bearings by means of which the third guide wheel is borne, and the third and fourth wheels can be optionally coupled together.

DESCRIPTION OF THE DRAWINGS

FIG. 1a is a diagrammatic illustration of the entry station section of an apparatus according to the invention;

FIG. 3 is a diagrammatic side elevation of the exit station ejector system;

FIG. 4 is a perspective view of this ejector system;

DESCRIPTION OF THE PREFERRED EMBODIMENTS

Figure 1B:
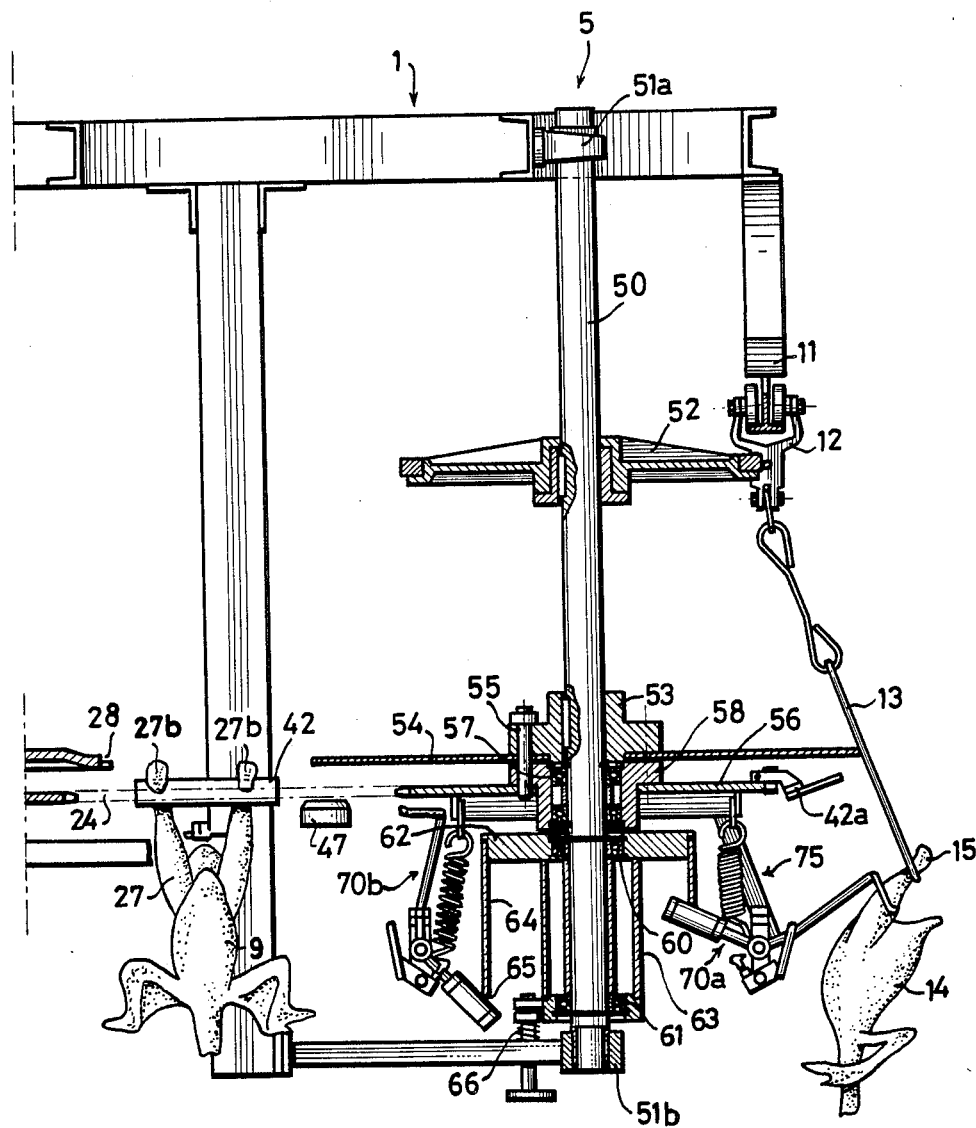
FIG. 1b is a corresponding adjoining illustration of the exit station.

The complete apparatus, illustrated in FIGS. 1a and 1b in combination, is denoted by reference 1, the parts thereof are accommodated in a frame, a horizontal member of which is indicated by reference 2 and a vertical member by reference 3. For the sake of clarity the other parts have been omitted from the drawing.

The entry station is denoted by reference 4 and the exit station by reference 5. The entry station cooperates with the first conveyor 6 over which carriages 7 bearing the shackles 8 move; these shackles are of the kind from which the birds, e.g. bird 9, are suspended by the feet 10. Exit station 5 cooperates with a conveyor 11 for carriages 12 from which hang shackles 13 of the type from which the birds, e.g. bird 14, are suspended at the hocks 15. Both the entry station 4 and the exit station 5 are of circular construction and in them the birds traverse a path which is a portion of a circle and in which both the entry and exit sections are situated tangentially to the circular path. A path configuration of this kind for a treatment station is known per se.

A conveyor for birds such as the conveyor 6, in which the birds are suspended by their feet, is known as a "picking line" and a conveyor such as the conveyor 11 in which the birds are suspended by the hocks is referred to as an "eviscerating line". The apparatus is intended to transfer birds from a picking line to an eviscerating line; as is customary, during the transfer operation the hock joints of the birds are cut.

The entry station is constructed from a vertical shaft 17, which is mounted to be freely rotatable in the top bearing 18 and the bottom bearing 19. A wheel-shaped driver 20 is secured to the shaft and cooperates with the carriages 7 so that their movement is transmitted to the wheel. In this way the shaft 17 is driven in synchronism with the conveyor 6. At the bottom end the shaft 17 bears a second wheel 21 via a flange 22, which also bears an externally toothed third wheel 23 situated at a lower level, with a chain 24 trained around it. Wheel 21 cooperates with an arcuate stop 25 situated thereabove for the shackles 8 and an arcuate guide 26 for the thighs 27 of the birds 9, said guide being situated beneath the wheel 23. Near the edge the wheel 21 is stepped as shown at 28. The edge cooperates conventionally with a rotating blade 29 driven by motor 30. The latter is accommodated in a carrier 31 which at 32 is pivotally connected to the frame member 3 while its other end is adjustably connected to the support arm 33, which is also connected to the member 3 at 34. In this way the cutter 29 can be adjusted as required with respect to the wheel 28 and the motor and blade unit can be pivoted fully in the counter clockwise direction so that the birds can pass without obstruction.

The chain 24 trained around wheel 23 bears a number of drivers 35, each of which bears a carrier 37 in the form of a hook, which is pivotable about a horizontal axis 36 and which has a long arm 37a journalled about pivot 36 and a short arm 37b bearing a member 38 in the form of a plate. Two slots 40, 41 are formed therein, and start from the front edge 39 thereof and converge rearwardly, and are intended to receive the bird's thighs, as shown in detail in FIG. 2. Parts 37 and 38 together form a transfer shackle as illustrated diagrammatically in FIG. 1b and indicated by reference 42.

Figure 2:
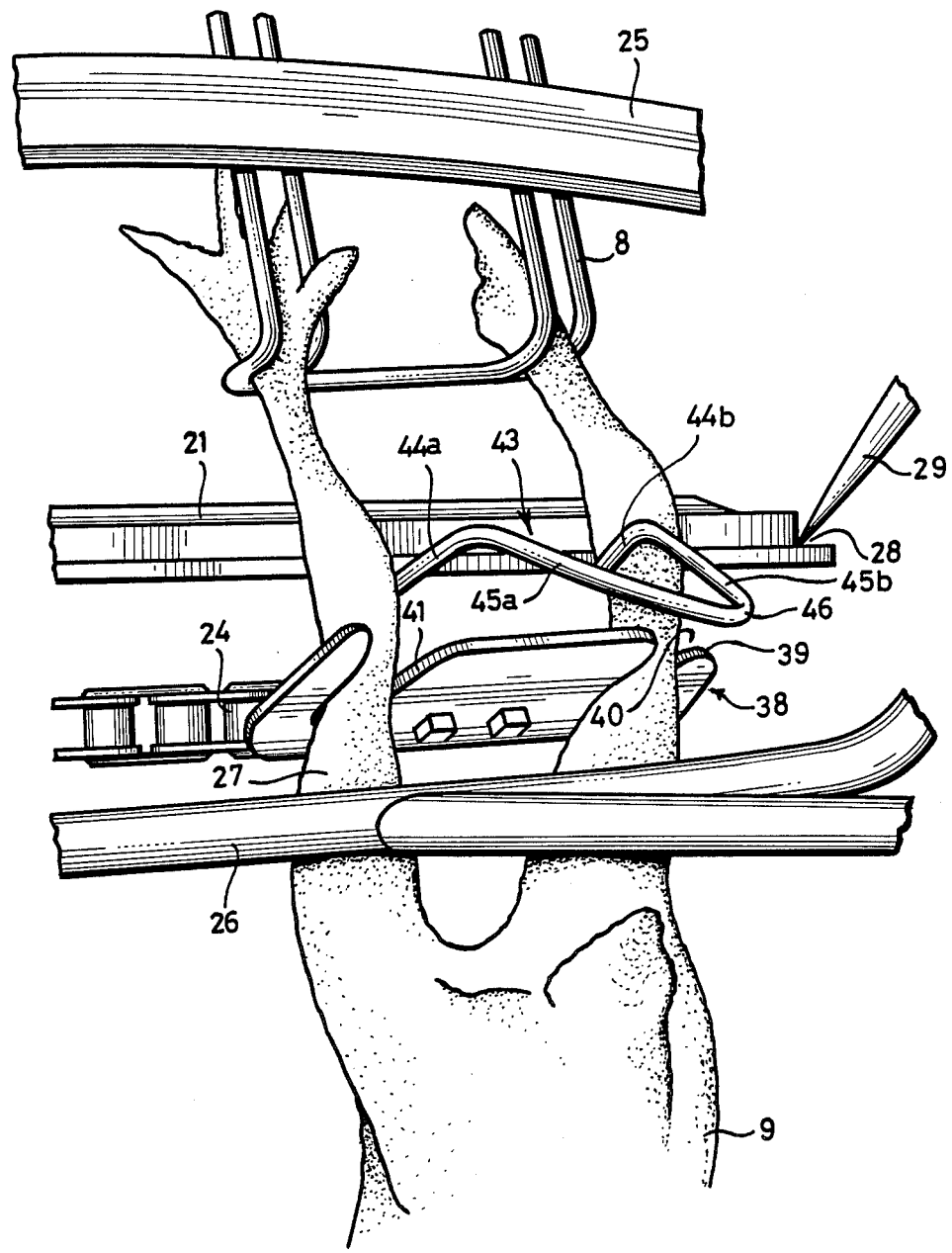
FIG. 2 is a perspective view of part of the entry station.

A number of guide yokes 43 are provided at the bottom of the wheel 23 and are so situated that during operation each transfer shackle 42 is always situated above a guide yoke 43 during part of its travel (see FIG. 2). Each yoke consists of the parts 44a and 44b which slope upwards to some extent and which converge only slightly, and which continue in the sharply convergent and downwardly sloping parts 45a, 45b, which meet at the point 46.

Up to the point where the birds are introduced into the transfer shackles 42, the conveyor extends tangentially to the wheels 20, 21 and 23 and since the movement of these wheels is synchronized with that of the carriages 7 in the conveyor 6, and the apparatus is also so adjusted that as the birds "enter" a suspension shackle 8 is always situated opposite a transfer shackle 42 and a guide yoke 43, the thighs 27 of the birds 9 will be received in the slots 40, 41 of the plate-shaped part 38 of a transfer shackle 42. Cooperation of the guide 26 and the edge 28 of the wheel 21 causes the birds to be pulled up somewhat and since each transfer shackle can pivot about the associated horizontal pivot 36 the plate-shaped part 38 formed with the slots 40, 41 can follow this movement. The final result is that the thighs 27 of the birds are pressed deeply into the slots 40, 41. After the birds have passed the rotating cutter 29, by means of which the hock joints 27a are cut, the bird 9 remains suspended in the transfer shackle 42 by the hocks 27b and is conveyed to the exit station 5 in this manner. In so doing the bird passes a diagrammatically illustrated weighing station 47 known per se.

The exit station 5 also has a vertical shaft 50 mounted rotatably in the top bearing 51a and the bottom bearing 51b. Secured to shaft 50 is the guide wheel 52 which cooperates with the carriages 12 so that the speed of rotation of the shaft 50 is synchronized with the speed of the conveyor 11. Shaft 50 also bears a top wheel 54 via driver 53. By means of the bolt 55 extending through driver 53, the bottom wheel 56 is coupled to the complete assembly, the chain 42 being trained round bottom wheel 56. This wheel 56 can freely rotate about axis 50 in the bearings 57 in the flange 58, but in the embodiment illustrated, in which the coupling bolt 55 is disposed in the driver 53, the entry station 4 and the exit station 5 rotate at the same angular velocity and the speeds of the conveyors 6 and 11 are thus coupled to one another. When the coupling bolt 55 is removed, the wheel 56 can have a different speed from the wheel 54, and the speeds of the picking line and eviscerating line are different from one another.

A wheel 62 with reinforcing cylinder 63 is disposed beneath the wheel 56 and is rotatable about shaft 50 via bearings 60 and 61. Wheel 62 bears a guide drum 64, the bottom end of which forms a guide path for the control cams of the ejectors, which will be described in detail hereinafter. A locking system 66 enables the drum 64 to be fixed in a specific angular position with respect to the fixed frame 1, so that the ejection position can be accurately determined.

Exit station 5 has a number of ejectors 70, one of which is shown in detail in FIG. 3. In FIG. 1b the ejector 70a is shown in the position directly after ejecting a bird from a transfer shackle 42a and its reception in shackle 13; ejector 70b is shown in the position in which the ejector is ready to transfer a bird from a transfer shackle to a suspension shackle.

FIG. 4 illustrates an ejector with a bird before its ejection from the transfer shackle.

Each ejector has a frame 71 constructed from two parallel carrier plates 72 connected to the carrier ring 73 (see FIG. 4), the latter being connected to the bottom of the wheel 56 via a number of supports 75 so that the ejector positions thus rotate in synchronism with the wheel 56 and obtain a fixed position with respect to the respective transfer shackles 42a borne by the chain 24. A pivot 76 about which a rocker arm 77 can pivot is received between the carrier plates 72. Rocker arm 77 has a long portion 78 bearing a U-shaped yoke 79 at one end, the open side 80 of which is directed towards the bird 14 for ejection. The short arm 81 of rocker 77 bears a control cam 82 which cooperates with the bottom edge 65 of the control drum 64. One end 83 of a tension spring 84 is connected to this short arm, the other end 85 being secured beneath the wheel 56 at place 86. In the position shown in FIG. 4, the spring 84 is tensioned and the ejector is thus ready to transfer a bird from a transfer shackle 42 to a shackle 13. This occurs when cam 82 at point 65a (see FIG. 4) clears the bottom edge 65 of the drum 64; spring 84 is then suddenly released and moves rocker arm 78 rapidly outwards so that yoke 79 pushes the thighs 27 at high speed out of the transfer shackle receiving slots; the thighs are caught in the shackle 13 which is suspended in readiness. On further movement of the cam 82 around the drum 64 the cam comes into contact with the downwardly extending portion 65b of the drum edge and during this stage of the movement the spring 84 is tensioned again.

The embodiment illustrated in FIGS. 3 and 4 contains an extra safety feature in the form of the stop 90 in the form of a yoke for the breast 91 of the bird 14, said stop being rotatable about the horizontal axis 92 extending between the plates 72 and being connected to the locking hook 93; the complete arrangement is such that in the absence of a bird the stop 91 tends to pivot by its own weight about the axis 92 away from the axis 76, so that the locking hook 93 falls behind the stop 94 connected to the short arm 81, so that even when the stop 82 clears the bottom edge 65a the ejector cannot come into operation. This situation is illustrated at the ejector 70b in FIG. 1b. Only when, as a result of the presence of the bird 14 resting by its breast 91 against the stop 90, the latter is pivoted in the counter-clockwise direction, does the hook 93 clear the stop 94 and the ejector can operate.

Another locking means for the rocker arm can be constructed in the form of a rocking locking lever (not shown) acting on the top part of the rocker arm and controlled by a release cam on the wheel 54, so that only when the angular position of the wheel 54 with shackle 13 moving with the second conveyor 12 coincides with the position of a frame can the arm be released. This is important when the wheels 54 and 56 are not coupled together, as a result of removal of the coupling bolt 55, and can therefore rotate at different speeds, this being necessary when the speed of the first conveyor differs from that of the second conveyor.

Conveyor 11 extends tangentially to the wheels 54 and 56 in such a manner that a bird suspended from a transfer shackle 72a comes exactly into position between an ejector station 71 and a receiving shackle 13; shackle 13 may be additionally guided by a rod-shaped driver 96 disposed on the underside of the wheel 54. When this situation is reached, cam 82 clears the bottom edge 65a (the position of the parts just before this happens is shown in FIG. 4), so that the spring 84 can expand and the ejector yoke 79 moves powerfully and rapidly outwards. The bird is knocked out of the transfer shackle 42a and its thighs 15 come into position in the shackle 13. This completes the transfer operation.

Figure 5:
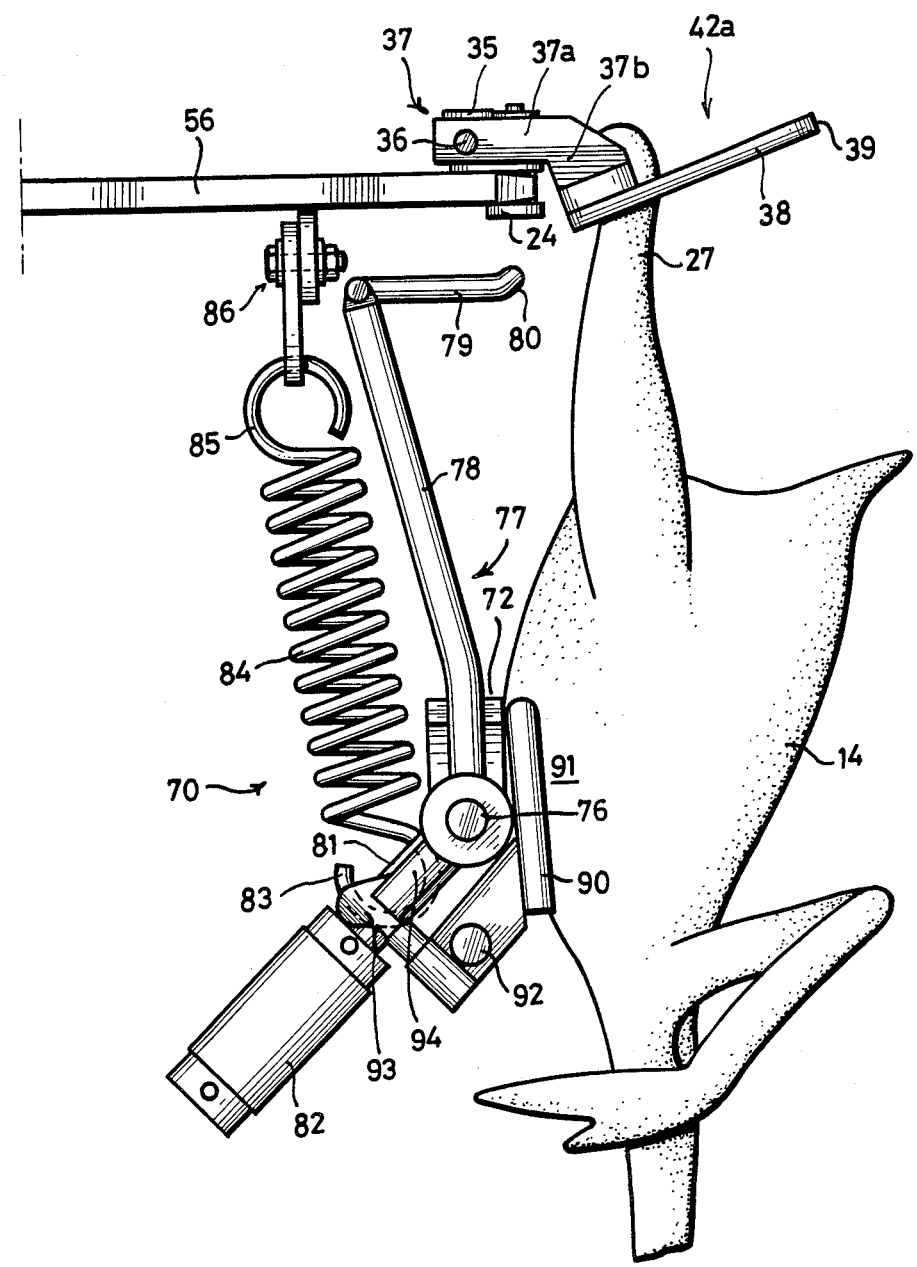
FIG. 5 is a diagrammatic side elevation of a second embodiment of the ejector system.
Figure 5:
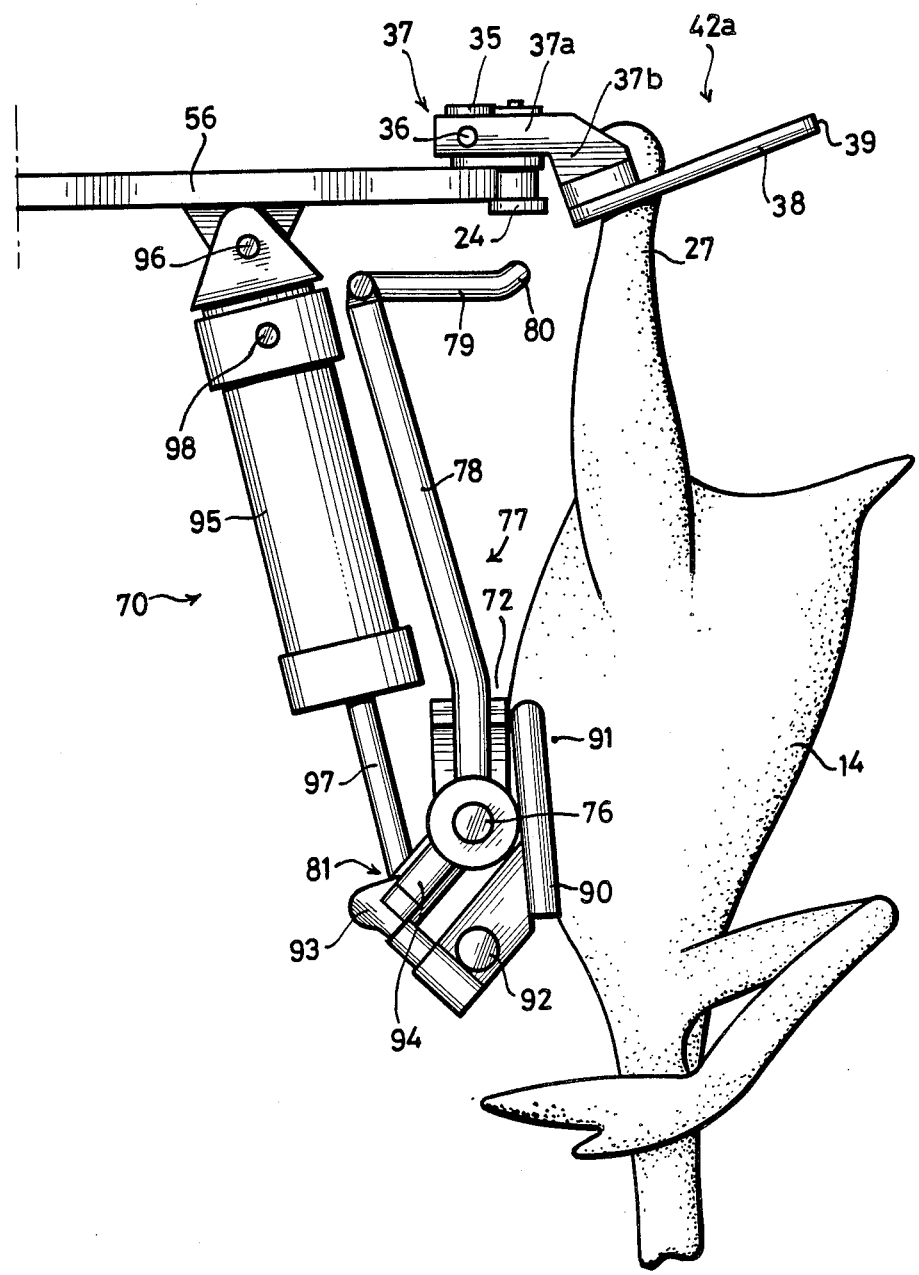

FIG. 5 is a diagrammatic side elevation of a second embodiment of the ejector station according to the invention; those parts which correspond to the parts already indicated in FIG. 3 are denoted by like references.

The difference from the embodiment according to FIG. 3 is that spring 84 and cam 82 are replaced by the pneumatic actuator 95, which is coupled to the wheel 56 pivotally about axis 96, while its piston rod 97 is coupled to the short arm 81 of the rocker arm 77. The supply of pressure medium, e.g. compressed air, to cylinder 95 can be controlled in any suitable manner. For example, the individual air supply lines for the various cylinders, each connected to connection 98, can be connected to a control wheel which corotates with the frames and which cooperates with a suitable pressure medium supply.

Figure 6:
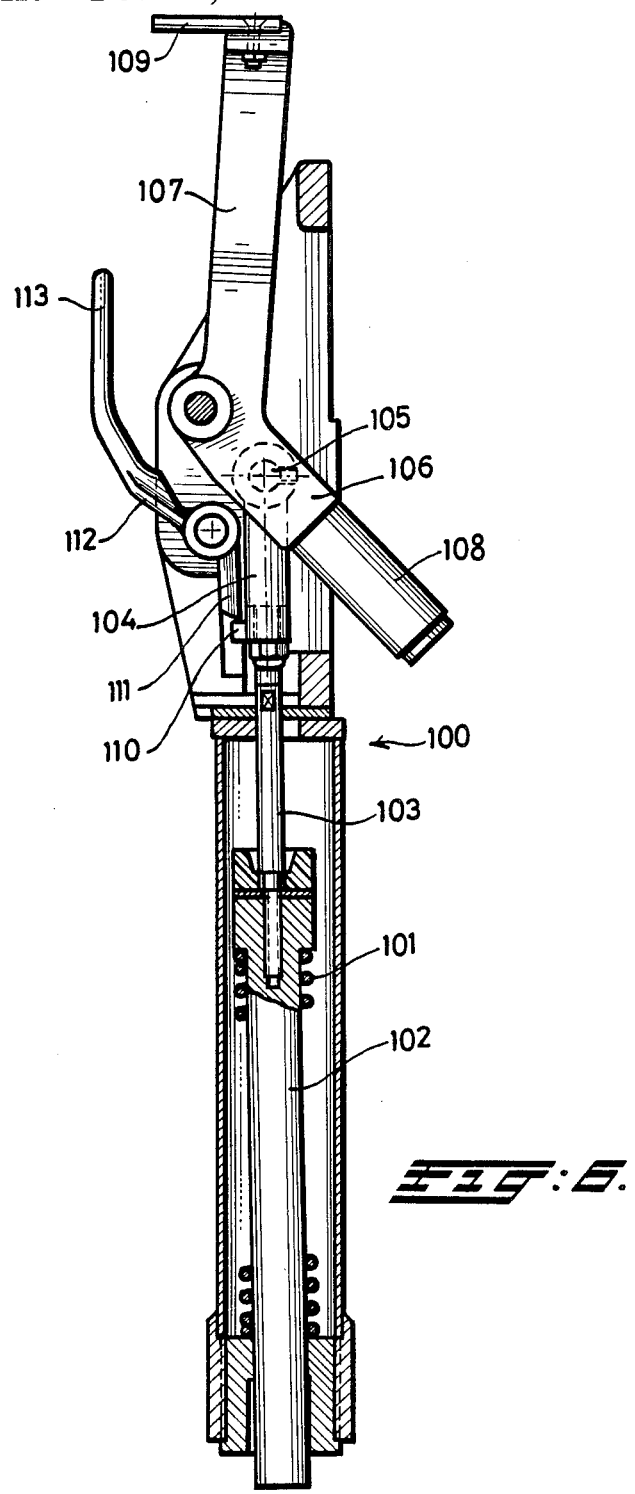
FIG. 6 is a diagrammatic side elevation of a third embodiment of the ejector system.

FIG. 6 is a diagrammatic side elevation of a third embodiment of the ejector system according to the invention. Frame 100 contains a compression spring 101 disposed around a guide rod 102 coupled to the push rod 103, the top end 104 of which is coupled via pivot 105 to the short end 106 of toggle level 106, 107. This short end 106 is connected to control cam 108 which, as described with reference to the embodiment shown in FIG. 3, cooperates with the bottom edge 65 of the drum 64. The toggle lever portion 107 bears the ejector 109.

The push rod 104 bears the cam 110 which cooperates with the end of the short part 111 of the toggle lever 111, 112 which bears the stop 113 from the body of the bird.

When the stop 113 is pivoted to the left with the spring 101 in the tensioned state, the cam 110 abutting the end of the toggle lever 111 prevents the ejector 109 from pivoting outwards. When, however, stop 113 is pivoted to the right as a result of a bird's body resting against it, the end of the toggle lever 111 clears the cam 110 and when the cam 108 clears the bottom edge 65a this cam pivots to the right in response to the spring 101 and the push rods 102, 103, so that the ejector 103 pivots to the left and ejects the bird.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. Apparatus for transferring slaughtered poultry from a first conveyor having first suspension shackles engaging the feet of the birds to a second conveyor having second suspension shackles engaging the hock joints of the birds via an endless transfer conveyor carrying outwardly projecting transfer shackles cooperating with said first conveyor and said second conveyor respectively and driven synchronously with the first conveyor comprising an entry station at the first conveyor for introducing the birds by their thighs into the transfer shackles, a means for cutting the hock joints of the birds, and an exit station at the second conveyor for transferring the birds from the transfer shackles to the second shackles, in which each of said outwardly projecting transfer shackles consists of a plate provided with two tapering take-up slots, the side of said plate opposite the entry openings of the slots being connected to the short arm of a hook-shaped carrier of which the long arm is connected pivotally about an axis parallel to the plane to the endless transfer belt and the exit station being provided with controllable ejectors acting upon the bird, the said ejectors being registered in turn with a transfer shackle and a second shackle, in which each transfer shackle cooperates with one of a number of guide yokes carried at the circumference of a guide wheel driven synchronously with the first conveyor and the endless belt in such a way that a guide yoke is situated above a transfer shackle when the latter receives the thighs of a bird, said yoke consisting of two first parts which converge in the direction of the first conveyor and slope upwardly to some extent and which merge into two downwardly extending second parts terminating in a point.

2. Apparatus according to claim 1 in which each of the ejectors comprises a rocking lever pivotable with the lower end about a horizontal axis and carrying at the top end a U-shaped yoke of which the open end is directed toward the bird said rocking lever being coupled to a pre-stressed spring element and to a control cam cooperating with a guide path having an abruptly changing shape for releasing the rocking lever and the spring element.

3. Apparatus according to claim 2, comprising an abutment element for the bird's body, said element being rotatable about a horizontal axis in the ejector frame and being coupled to a safety catch which cooperates with a locking hook of the rocking lever and which, when the stop is in the pressed-in position, releases the rocking lever.

4. Apparatus according to claim 2, in which the spring element is a compression spring which acts on one end of a push rod, the other end of which is pivotably coupled to the short part of the rocking lever, the long part of which bears the ejector, said push rod bearing a laterally projecting stop cam which cooperates with the short end of a second toggle lever, the other part of which is coupled to the stop for the bird's body.

5. Apparatus according to claim 1, in which the entry station is constructed with a first guide wheel rotatable about a vertical shaft, a guide for the first suspension shackles, said guide being situated thereabove and extending arcuately over part of the wheel periphery starting from an entry position, and a guide for the birds' thighs, said guide being situated beneath the first guide and also extending arcuately over a part of the wheel periphery starting from an entry portion, and a cutter system cooperating with the edge of the guide wheel, and a second guide wheel situated beneath the first guide wheel and having its periphery coupled to the belt bearing the transfer shackles, while the exit station is constructed with a third wheel rotatable about a second vertical shaft and coupled to the guide belt, and, situated thereabove and projecting radially therefrom, a fourth guide wheel, the periphery of which forms a stop for the second suspension shackles, the ejector frames being disposed for rotation in a ring around said second vertical shaft in such a manner that the control cams thereof cooperate with the circular guide path also disposed around said second shaft.

6. Apparatus according to claim 5, in which the first and second guide wheels are coupled to the first shaft, which is rotated by the first conveyor via a first driver wheel, and the fourth guide wheel is coupled to the second shaft, which is rotated by the second conveyor via a second driver wheel said second shaft carrying bearings by means of which the third guide wheel is borne, and the third and fourth wheels can be optionally coupled together.

7. Apparatus according to claim 5, in which the ejector frames are coupled to the third guide wheel.

8. Apparatus according to claim 2, in which the circular guide path is formed by the bottom edge of a guide drum adjustable in an angular position around the second shaft.

* * * * *